United States Patent Office 3,766,210

Patented Oct. 16, 1973

1

3,766,210

5,11-DIHYDRODIBENZOXA (OR THIA) ZEPINE DERIVATIVES

Harry Louis Yale and Ramesh B. Petigara, New Brunswick, N.J., assignors to E. R. Squibb & Sons, Inc., New York, N.Y.

No Drawing. Filed Nov. 24, 1970, Ser. No. 92,329

Int. Cl. C07d *51/70*

U.S. Cl. 260—333 R 5 Claims

ABSTRACT OF THE DISCLOSURE 5,11-dihydrodibenzoxa (or thia) zepine derivatives are provided having the structure

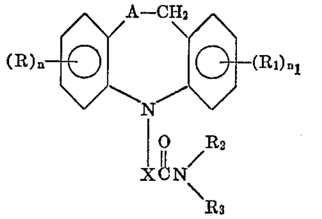

wherein A is O, S, SO, or $SO_2$; R and $R_1$ are the same or different and can be halogen, trifluoromethyl, lower alkyl, cycloalkyl, lower alkylmercapto, lower alkyloxy, cyano or di-lower alkylsulfamoyl; X is an alkylene radical; $R_2$ and $R_3$ may be the same or different and are hydrogen, lower alkyl, substituted or unsubstituted aminoalkylene of the formula

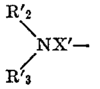

wherein $R'_2$ and $R'_3$ can include any of the $R_2$ and $R_3$ radicals and X′ can include any of the X groups, monocyclic cycloalkyl, monocyclic cycloalkyl-lower alkyl, hydroxy-lower alkyl, monocyclic aryl, monocyclic aryl-lower alkyl, or monocyclic heterocyclic alkyl, or $R_2$ and $R_3$ may form a heterocyclic radical along with the nitrogen to which they are attached; *n* is 0, 1 or 2; and *n′* is 0, 1, or 2. These compounds are useful in lowering blood pressure and as anti-inflammatory agents.

The present invention relates to 5,11-dihydrodibenzoxa-(or thia)zepine derivatives of the structure (I)

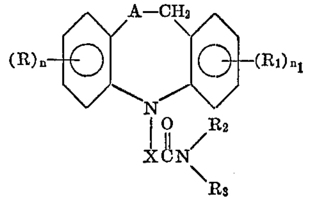

wherein R and $R_1$ are the same or different and can be halogen, trifluoromethyl, lower alkyl, cycloalkyl, lower alkylmercapto, lower alkyloxy, cyano or di-lower alkylsufamoyl, *n* is 0, 1 or 2 and $n_1$ is 0, 1 or 2, X is an alkylene radical containing from one to about six carbon atoms in the linking chain.

$R_2$ and $R_3$ may be the same or different, representing hydrogen, lower alkyl, substituted or unsubstituted aminoalkylene of the formula

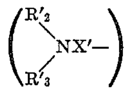

wherein $R'_2$ and $R'_3$ can include any of the $R_2$ and $R_3$ radicals and X′ can include any of the X groups, monocyclic cycloalkyl, monocyclic cycloalkyl-lower alkyl, hydroxy-lower alkyl, monocyclic aryl, monocyclic aryl-lower alkyl, or monocyclic heterocyclic alkyl.

2

The

group may also form a heterocyclic radical.

X represents straight or branched chain bivalent aliphatic hydrocarbon groups having from one to about six carbon atoms in the linking chain, such as methylene, ethylene, propylene, butylene, dimethylethylene, 1-propylbutylene, 1,2-diisopropyl pentylene, 1-ethyl-2-butylhexylene and the like. Furthermore, X as a bivalent group can correspond to any of the lower alkyl groups exemplified hereinafter with the carbon limitations noted above.

The term "lower alkyl" as employed herein includes both straight and branched chain radicals of up to eight carbon atoms, for instance, methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, and the like.

The term "halogen" includes F, Br, Cl or I.

The term "lower alkoxy" includes straight and branched chain radicals which correspond to the above lower alkyl groups attached to an oxygen atom.

The lower alkylmercapto groups contain up to eight carbon atoms and include methylmercapto, ethylmercapto, propylmercapto and mercapto radicals containing any of the lower alkyl groups mentioned hereinbefore.

The term "monocyclic aryl" as employed herein contemplates monocyclic carbocyclic aryl radicals, for instance, phenyl and substituted phenyl radicals, such as lower alkyl phenyl (e.g., o-, m- or p-tolyl, ethylphenyl, butylphenyl, and the like), di(lower alkyl)phenyl (e.g., 2,4-dimethylphenyl, 3,5-diethylphenyl, and the like), halophenyl (e.g., chlorophenyl, bromophenyl, iodophenyl, fluorophenyl), o-, m- or p-nitrophenyl, dinitrophenyl (e.g., 3,5-dinitrophenyl, 2,6-dinitrophenyl, and the like), trinitrophenyl (e.g., picryl).

The term "monocyclic cycloalkyl" includes cyclic radicals containing from 3 to 6 ring members (e.g., cyclopropyl, cyclobutyl, cyclopentyl, and cyclohexyl).

The aminoalkylene group

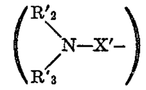

includes primary, secondary or tertiary aminoalkylene groups wherein $R'_2$ and $R'_3$ and X′ can include any of the $R_2$, $R_3$ and X groups mentioned herein.

As indicated hereinbefore,

may form a heterocyclic radical. The symbols $R_2$ and $R_3$ may together represent the carbon (and hydrogen) and the oxygen, sulfur or nitrogen atoms which, with the nitrogen atoms in the above group form a 5-, 6- or 7-membered nitrogen heterocyclic containing not more than one hetero atom in addition to the nitrogen already shown in the group and less than 21 atoms in the radical (excluding hydrogen). The heterocyclic radicals may include one to three substituents including lower alkoxy, lower alkyl or aryl as defined hereinbefore; trihalomethoxy, such as trifluoromethoxy; trihalomethylmercapto, such as trifluoromethylmercapto; N,N-dialkylsulfamoyl groups, such as N,N-dimethylsulfamoyl; lower alkanoyl groups as defined hereinafter such as acetyl, propionyl, and the like; hydroxy; hydroxy-lower alkyl, such as hydroxymethyl, 2-hydroxyethyl, or the like; hydroxy-lower alkoxy-lower alkyl, such as 2-(2-hydroxyethoxy)ethyl, or the like; alkanoyloxy containing an alkanoyl as defined herein; alkanoyloxy-lower alkyl (up to about 14 carbons in the alkanoyl group), such as 2-heptanoyloxyethyl; carbo-lower alkoxy, such as carbomethoxy, carboethoxy, carbopropoxy, or the like; or 2-(alkanoyloxy-lower alkoxy)-lower alkyl (with up to about 14 carbons in the alkanoyl group), such as 2-(decanoyloxyethoxy)-ethyl, heterocyclic radicals such as defined herein as well as pyridyl and benzimidazolyl, or the like.

Illustrative of the heterocyclic radicals represented by

are the following: piperidino; (lower alkyl)piperidino [e.g., 2-, 3- or 4(lower alkyl)piperidino such as 2-(ethyl) piperidino, or 4-(isopropyl)piperidino]; di(lower alkyl) piperidino [e.g., 2,4-, 2,5- or 3,5-di(lower alkyl)piperidino such as 2,4-di(methyl)piperidino or 2,5-di(t-butyl)piperidino]; (lower alkoxy)piperidino [e.g., 2-methoxypiperidino or 3-methoxypiperidino]; hydroxypiperidino [e.g., 3-hydroxy- or 4-hydroxypiperidino]; aminomethylpiperidino [e.g., 4-aminomethylpiperidino]; 4-[1-(2-oxobenzimidazolyl]piperidino; 4,4 - disubstituted piperidino like 4 - hydroxy - 4 - phenylpiperidino or 4-hydroxy-4-p-chloro or p-methyl or m-(trifluoromethyl)phenylpiperidino, 4 - carbamoyl - 4 - [piperidino]piperidino; pyrrolidino; (lower alkyl)pyrrolidino [e.g., 3-(methyl)pyrrolidino]; di(lower alkyl)pyrrolidino [e.g., 3,4-(dimethyl) pyrrolidino]; (lower alkoxy)pyrrolidino [e.g., 2-methoxy-pyrrolidino]; morpholino; (lower alkyl)morpholino [e.g., 3-methylmorpholino]; di(lower alkyl)morpholino [e.g., 3,5 - dimethylmorpholino]; (lower alkoxy)morpholino [e.g., 2 - methoxymorpholino]; thiamorpholino; (lower alkyl)thiamorpholino [e.g., 3-methylthiamorpholino]; di-(lower alkyl)thiamorpholino [e.g., 3,5 - dimethylthiamorpholino]; (lower alkoxy)thiamorpholino [e.g., 3-methoxy-thiamorpholino]; piperazino; $N^4$-aryl piperazino, [e.g., o-anisyl, p-chlorophenyl or m-tolyl piperazino]; (lower alkyl)piperazino [e.g., N-methylpiperazino]; di(lower alkyl)piperazino [e.g., 2,5-dimethylpiperazino or 2,6-dimethylpiperazino]; (lower alkoxy)piperazino [e.g., 2-methoxypiperazino]; (hydroxy-lower alkyl)piperazino [e.g., $N^4$-(2 - hydroxyethyl)piperazino]; (alkanoyloxy-lower alkyl)piperazino wherein the alkanoyloxy group has up to 14 carbons [e.g., $N^4$-(2-heptanoyloxyethyl) piperazino or $N^4$-(2 - dodecanoyloxyethyl)piperazino]; (hydroxy-lower alkoxy-lower alkyl)piperazino [e.g., (hydroxy-methoxy-methyl)piperazino]; (carbo-lower alkoxy) piperazino [e.g., $N^4$-(carbomethoxy-, carboethoxy-, or carbopropoxy)piperazino]; $N^4$ - heterocyclic-piperazino [e.g., $N^4$ - (pyridyl)piperazino]; homopiperazino; or $N^4$-(hydroxy-lower alkyl)homopiperazino [e.g., $N^4$-(2-hydroxyethyl)homopiperazino].

The N-oxides of the compounds of Formula I where Y represents a nitrogen containing heterocyclic radical can be formed by reacting such Formula I compounds with a peracid such as m-chloroperbenzoic acid, perbenzoic acid or monoperphthalic acid in a suitable solvent such as chloroform.

The compounds of Formula I form acid addition salts by reaction with various inorganic and organic acids. These salts frequently provide convenient means for separating the product from the reaction mixture in which it is produced or from the solvent in which it is extracted in view of their insolubility in various media. Thus the product may be precipitated in the form of an insoluble salt and converted, by conventional techniques, to the free base or to another soluble or insoluble salt as desired.

Illustrative salts include the hydrohalides, such as hydrochloride, hydrobromide and hydroiodide, especially the first two, other mineral acid salts such as phosphate, sulfate, nitrate, etc., organic acid salts such as oxalate, tartrate, malate, maleate, citrate, pamoate, fumarate, camphorsulfonate, methanesulfonate, benzenesulfonate, toluenesulfonate, salicylate, benzoate, ascorbate, mandelate, or the like.

The compounds of Formula I also form quaternary ammonium salts with lower alkyl halides, for example, methyl bromide, ethyl bromide and propyl iodide; benzyl halides, such as benzyl chloride; and dilower alkyl sulfates, such as dimethyl sulfate. To form the quaternary ammonium salts, the free base initially formed is interacted with at least one equivalent of the desired alkylating agent in a suitable solvent, e.g., acetone, benzyl alcohol, dioxane or cyclohexanone.

Examples of compounds falling within the present invention include, but are not limited to, the following wherein the symbol A represents —O—, —S—, —SO— and —$SO_2$—; each formula therefore, in essence, representing four species.

(1)

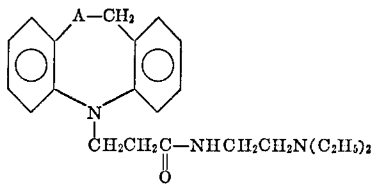

(2)

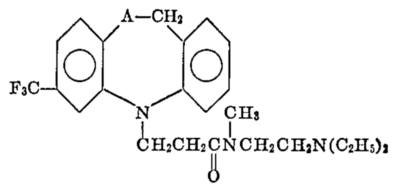

(3)

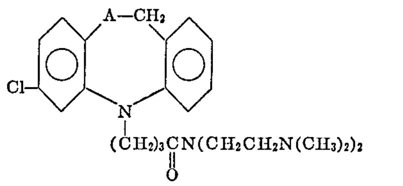

(4)

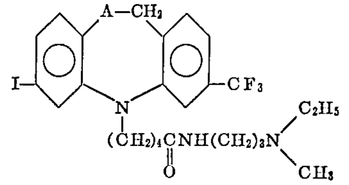

(5)

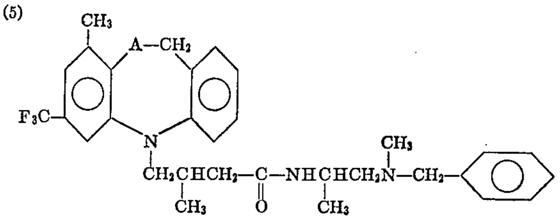

(6)

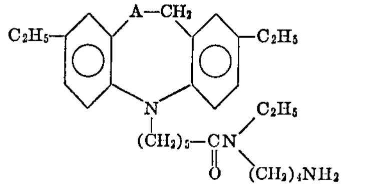

(7)

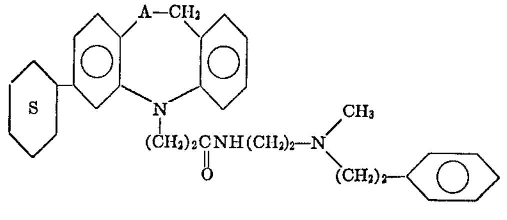

(8)
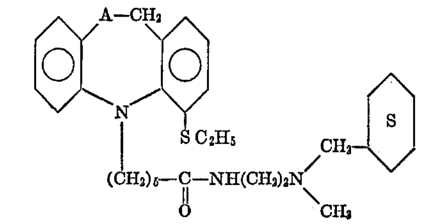
(9)
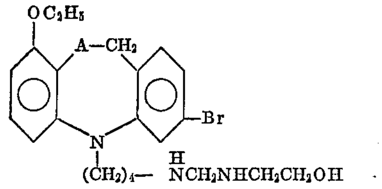
(10)
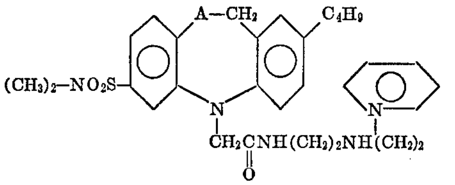
(11)
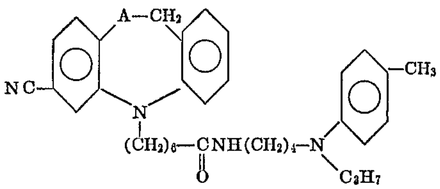
(12)
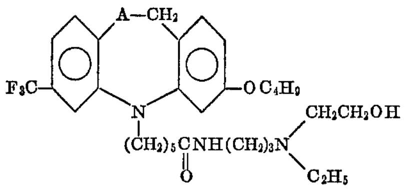
(13)
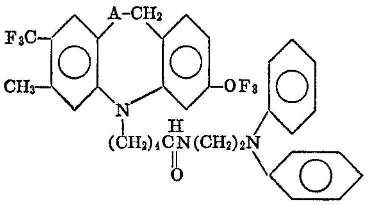
(14)
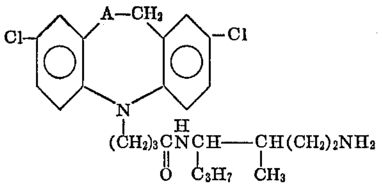
(15)
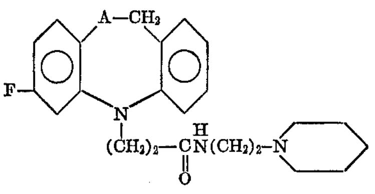
(16)
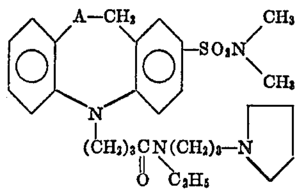
(17)
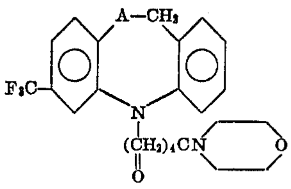
(18)
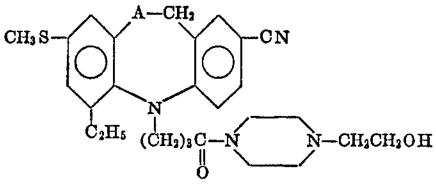
(19)
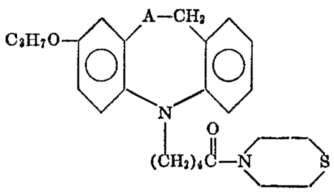
(20)
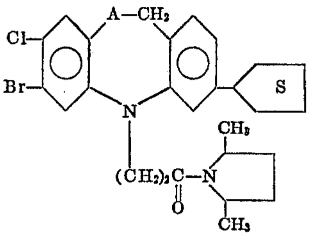
(21)
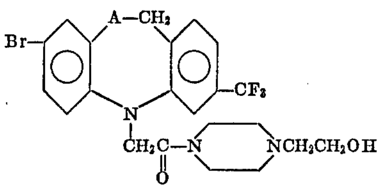
(22)
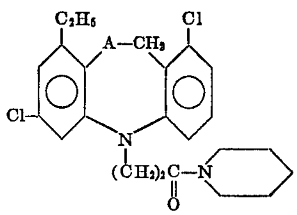
(23)
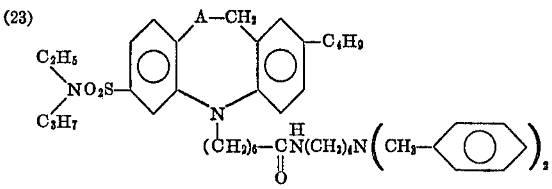

(24)

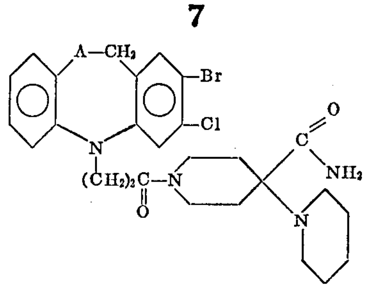

(25)

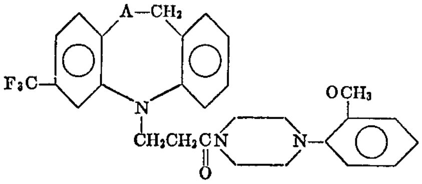

(26)

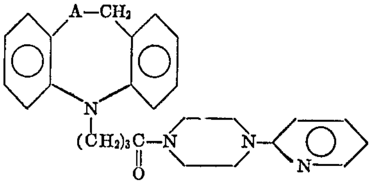

The compounds of Formula I can be prepared by reacting a compound of the structure (II)

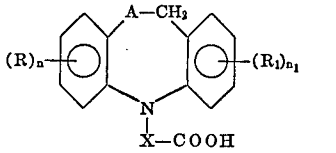

wherein R, $R_1$, X, *n*, $n_1$, and A are as defined hereinbefore, with a phosphorus pentahalide, such as phosphorus pentachloride in a molar ratio of II:pentahalide of within the range of from about 0.9:1 to about 1:1, in the absence of oxygen, and in the presence of an inert solvent, such as benzene, toluene, xylene, pentane, hexane, etc., at a temperature within the range of from about 0 to about 10° C., to form an acyl halide of the structure (III)

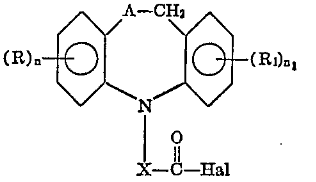

The acyl halide III can then be reacted with a compound of the structure (IV)

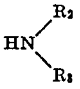

in a molar ratio of acyl halide III:compound IV of within the range of from about 1:1 to about 2:1, using a solvent such as chloroform, benzene, toluene or xylene, at a temperature within the range of from about 20° to about 130° C., to form the Formula I compounds.

Furthermore, compound IV can be reacted with an ester of the structure (IVa)

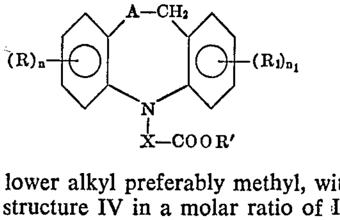

wherein R′ is lower alkyl preferably methyl, with a compound of the structure IV in a molar ratio of IVa:IV of from about 1:1 to 1:5, with or without a solvent to form compounds of Formula I; when a solvent is employed, it can be represented by benzene, toluene, xylene or the like.

In addition, compounds of the invention can be prepared by reacting the acid (II)

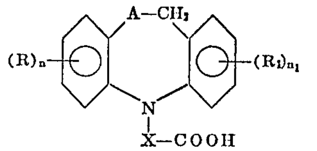

with a compound of the structure (IV)

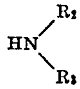

in an inert solvent at a temperature within the range of from about 110 to about 140° to remove water azeotropically to give compounds of Formula I.

Compounds of structure I wherein A is SO can be prepared as follows: Compounds of the structure II wherein A is S are treated with an oxidizing agent like $H_2O_2$ in an alcohol solvent or perbenzoic acid or m-chloroperbenzoic acid in a solvent like chloroform to give a sulfoxide of the structure V.

(V)

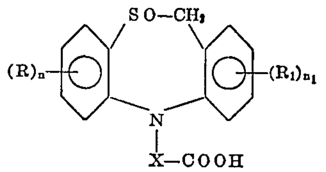

Compound V or an ester thereof such as compounds IVa or IX defined hereinafter can then be reacted with an amino alkylene amine as described hereinbefore to form the compounds of Formula I.

Compounds of Formula I wherein A is $SO_2$ can be formed by treating compound II or sulfoxide V with an oxidizing agent like $H_2O_2$ in formic or acetic acid to give sulfones of the structure VI.

(VI)

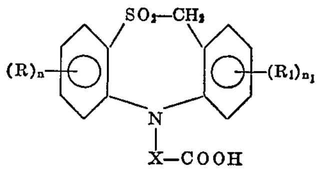

The starting materials of Formula II are prepared by several methods. One method comprises reacting compounds having the Formula VII:

(VII)

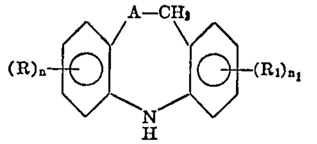

with a nitrile of Formula VIIa (e.g., acrylonitrile, 2-methylacrylonitrile, 2 - isopropylacrylonitrile, 2 - pentylacrylonitrile, and so forth):

(VIIa)

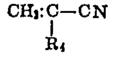

wherein $R_4$ is H or a lower alkyl group (e.g., straight or branched chain from about 1 to 6 carbons) yields compounds of Formula VIII (VIII)

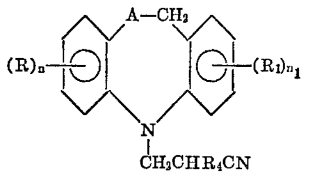

wherin $n$, $n_1$, R, $R_1$, A and $R_4$ are as defined herein.

This reaction is carried out by employing an excess of the nitrile $CH_2:CR_4CN$ as the solvent. The temperature utilized in the reaction can be varied from about 0° to about 100° C. with the preferred range being between about 0° and about 55° C. This reaction proceeds expeditiously when a small amount (up to about 1%) of a strong base like sodium hydroxide, sodium methoxide, potassium t-butoxide, or benzyl trimethylammonium hydroxide (Triton B) is used as the catalyst.

Compounds with the nitrile structure VIII are converted to carboxylic acid of Formua II by heating at reflux temperatures with sufficient aqueous or alcoholic alkali metal hydroxide, e.g., sodium hydroxide or potassium hydroxide in methanol or ethanol.

Another procedure for preparing compounds of Formula I is to treat the compounds of structure VIII with alcoholic hydrogen halide, such as hydrogen chloride in methanol, ethanol, and so forth, at room temperature whereby esters of the structure IX are formed, (IX)

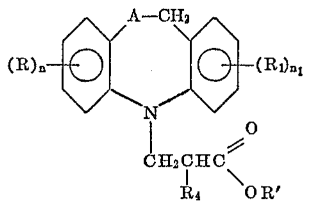

wherein R′ is lower alkyl.

By saponifying compound IX with an equivalent of alkali metal hydroxide, e.g., sodium hydroxide lithium hydroxide, and so forth, the desired carboxylic acids of structure II can be recovered.

Alternatively, a general procedure for preparing the compounds of structure II which may be utilized is to react the compounds having Formula VII with haloalkylenecyanide of the general structure IXa (IXa) Z—X—CN wherein Z is halogen e.g., chloro, iodo or bromo; and X is as defined herein. This yields a nitrile of Formula VIII. Examples of haloalkylenecyanide reagents that may be utilized are 3-chloropropionitrile, 3-bromobutyronitrile, and so forth. The reaction may be carried out in an alcohol, such as ethanol, propanol, and so forth, as the solvent, in the presence of at least one molar equivalent of anhydrous potassium carbonate, or in an aromatic solvent like benzene, toluene, or xylene, using at least one molar equivalent of alkali metal hydride, e.g., sodium hydride, lithium hydride, and so forth, or alkali metal amide, e.g., sodium amide or in an aliphatic ketone like acetone or ethyl methyl ketone using at least one molar equivalent of powdered alkali metal hydroxide, e.g., sodium hydroxide or lithium hydroxide. The desired temperature in these reactions is between 60° and 150° C. The compounds of Formula VIII prepared by these reactions may be thereafter treated as indicated above to yield compounds of Formula I.

Examples of compounds of Formula VII where A is S are set out in U.S. Pats. Nos. 3,188,321 and 3,188,322.

Examples of compounds of Formula II where A is O or S can be found in U.S. Pats. Nos. 3,069,432, and 3,453,046 and in a paper entitled "Novel Polycyclic Heterocycles," by Yale et al., J. Med. Chem. 13, 713 (1970).

Examples of compounds of Formula VII wherein A is SO or $SO_2$ can be found in the above mentioned paper by Yale et al.

Furthermore, compounds of Formula VII wherein A is SO can be formed by heating a compound of the structure (X)

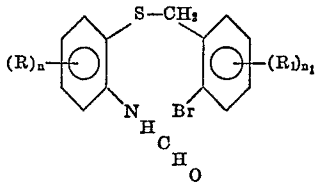

in the presence of potassium carbonate, Cu bronze, and a suitable solvent to form compounds of the structure (XI)

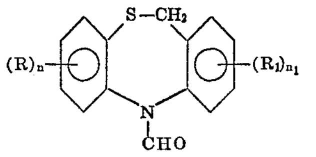

and treating compound XI with m-chloroperbenzoic acid in the presence of chloroform and then treating with ether to form a compound of the structure XII (XII)

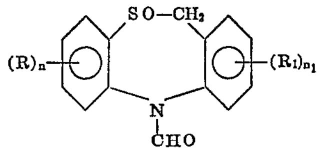

which can be treated with alcohol such as ethanol and base such as aqueous sodium hydroxide to form a compound of the structure (XIII)

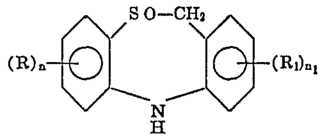

Compounds of Formula VII wherein A is $SO_2$ can be formed by treating compounds of the structure XI with an oxidizing agent such as hydrogen peroxide in the presence of formic acid to form a compound of the structure (XIV)

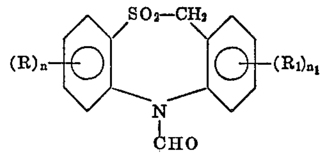

and treating XIV with alcohol such as ethanol and base such as aqueous sodium hydroxide to form a compound of the structure
(VX)
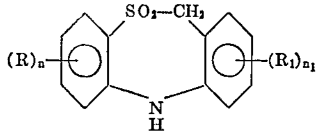
Examples of starting materials which can be employed in preparing the compounds of the invention include, but are not limited to, the following wherein A can be O, S, SO or $SO_2$.
(1)
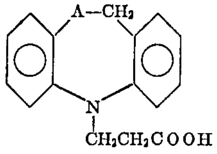
(2)
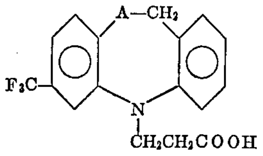
(3)
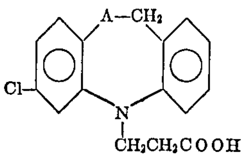
(4)
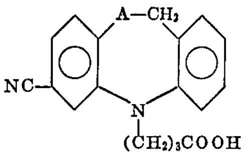
(5)
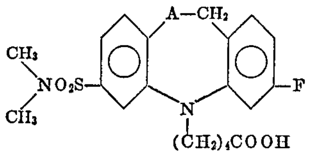
(6)
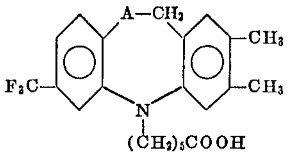
(7)
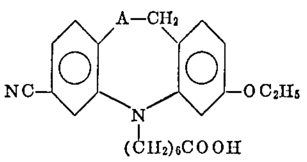
(8)
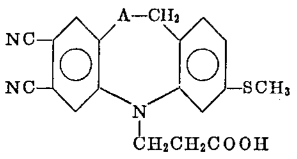
(9)
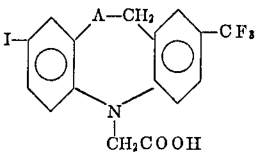
(10)
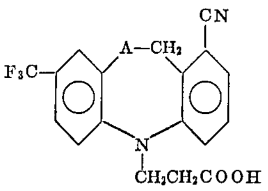
(11)
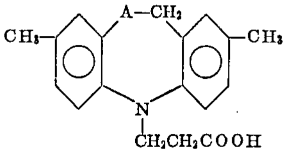
(12)
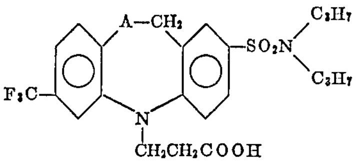
(13)
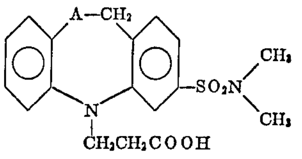
(14)
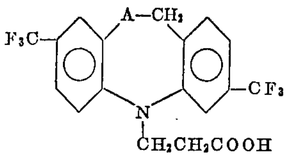

(15)
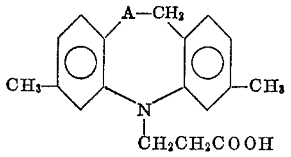

(16)
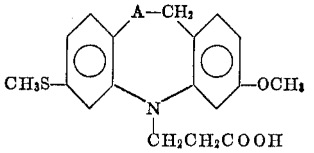

(17)
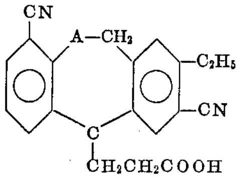

(18)
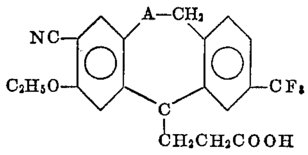

(19)
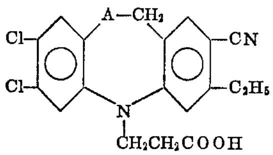

(20)
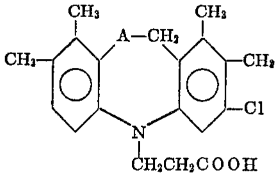

(21)
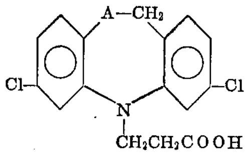

(22)
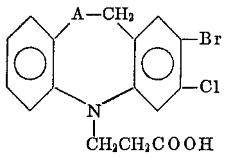

(23)
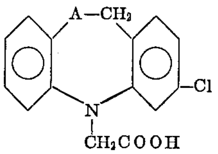

The compounds of the invention produce gradual hypotension beginning a few minutes after dosing and yielding a moderate hypotension, i.e., a fall in blood pressure of about 20% or greater lasting about five hours after dosing.

The hypotensive agents of the invention or a physiologically acceptable salt thereof may be compounded according to accepted pharmaceutical practice in oral dosage forms such as tablets, capsules, elixirs or powders or parenterally in an injectable form in a sterile vehicle prepared according to conventional pharmaceutical practice. The dosage level may vary from about 1 mg./kg. to about 50 mg./kg.

Liquid oral dosage forms may be prepared by dissolving the hypotensive agent in a suitable solvent, e.g., propylene glycol. Oral tablets may be prepared by incorporating the hypotensive agent into suitable pharmaceutical carriers. Injectable forms may be prepared by incorporating the hypotensive agent in a sterile vehicle, e.g., propylene glycol, according to conventional practice.

In addition, the new compounds of this invention have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carrageen edema assay in rats. The active substance may be utilized in compositions such as tablets, capsules, solutions or suspensions containing up to about 300 mg. per unit of dosage of a compound or mixture of compounds of Formula I or physiologically acceptable acid addition salt thereof. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The compounds of the invention may also be used as surface disinfectants. About 0.01 to 1 percent by weight of any of these substances may be dispersed on an inert solid or in a liquid such as water and applied as a dust or spray. They may be incorporated also, for example, in a soap or other cleaning agent, e.g., a solid or liquid detergent, detergent composition, for example, in general cleaning, in cleaning dairy barns or equipment or cleaning food handling or processing equipment.

Furthermore, the compounds of the invention may be used as water-softeners and corrosion inhibitors.

The following examples are illustrative of the invention and constitute preferred embodiments. Other members of the class are produced by utilizing the appropriately substituted starting material.

EXAMPLE 1

N-[2-(diethylamino)ethyl]-5,11-dihydro-7-(trifluoromethyl) dibenz[b,e][1,4]oxazepine-5-propionamide oxalate (I) 5,11-dihydro-7-(trifluoromethyl)dibenz[b,e][1,4] oxazepine-5-propionic acid (a) 5,11-dihydro-7-(trifluoromethyl)dibenz[b.e.][1,4] oxazepine-5-propionitrile.—To 50.0 g. of 5,11-dihydro-7-(trifluoromethyl)dibenz[b,e,][1,4]oxazepine in 60 ml. of distilled acrylonitrile is added, in 5 minutes, 0.80 ml. of Triton B. Subsequently, the mixture is heated for one hour under reflux and the product isolated by extraction with benzene to give 5,11-dihydro-7-(trifluoromethyl) dibenz[b,e,][1,4]oxazepine-5-propionitrile, M.P. about 161–163°.

(b) 5,11-dihydro-7-(trifluoromethyl)dibenz[b,e][1,4] oxazepine-5-propionic acid, methyl ester.—5,11-dihydro-7 - (trifluoromethyl)dibenz[b,e][1,4]oxazepine-5-propionitrile, 15.0 g., is dissolved in 240 ml. of dry dioxane and to this 140 ml. of 30% methanolic hydrogen chloride is added. The solution is stirred for 36 hours, 6 ml. of $H_2O$ is added, stirred 0.5 hour, and then concentrated in vacuo to 120 ml. The solid is filtered, and the filtrate is concentrated to dryness in vacuo. The residual liquid is taken up in 200 ml. of diethyl ether, treated with Darco and Hyflo, the diethyl ether solution is concentrated and the residue distilled in vacuo to give 5,11-dihydro-7-(trifluoromethyl)dibenz[b,e,][1,4]oxazepine - 5 - propionic acid, methyl ester, B.P. about 166–168° (0.08 mm.), M.P. about 70.0–71.5°.

(c) 5,11-dihydro-7-(trifluoromethyl)dibenz[b,e][1,4]-oxazepine-5-propionic acid.—5,11 - dihydro-7-(trifluoromethyl)dibenz[b,e,][1,4]oxazepine - 5 - propionic acid, methyl ester, 3.15 g., is dissolved in 315 ml. of methanol and to this 0.5 g. of potassium hydroxide dissolved in 25 ml. of water is added. The mixture is refluxed for taken up in 250 ml. of water and this solution is acidified with 2% aqueous HCl to give 5,11-dihydro-7-(trifluoromethyl)dibenz[b,e,][1,4]oxazepine - 5 - propionic acid, M.P. about 107–109°.

(II) N-[2-(diethylamino)ethyl]5,11 - dihydro - 7 - (trifluoromethyl)dibenz[b,e][1,4]oxazepine - 5 - propionamide oxalate To 10.6 g. of 5,11-dihydro-7-(trifluoromethyl)dibenz-[b,e][1,4]oxazepine - 5 - propionic acid in 120 ml. of anhydrous benzene at 5–6° is added dropwise 8.3 g. of phosphorus pentachloride in 50 ml. of benzene. The reaction mixture is stirred for 1 hour at 30°, 5.0 g. sodium hydrosulfite added, and the whole filtered. The filtrate is concentrated in vacuo, the residue is dissolved in 200 ml. of refluxing petroleum ether, treated with Darco, and filtered. This on cooling at 10° gives 10.3 g. (93%) of white crystalline acid chloride, M.P. 76–77°. This is dissolved in 100 ml. of chloroform and the solution added dropwise to 4.64 g. of 2-(diethylamino)ethylamine and 6.0 g. of triethylamine in 50 ml. of chloroform. The reacting mixture is heated under reflux for 7 hours, cooled, washed, dried, and concentrated in vacuo to give the base. This is dissolved in 15 ml. of 2-propanol and the solution treated with 3.0 g. of oxalic acid in 20 ml. of 2-propanol. This on cooling gives 10.1 g. of white crystalline product, M.P. 180–182° (dec.).

EXAMPLES 2 TO 7

Employing the procedure of Example 1 including the phosphorus pentachloride, but substituting the remaining starting materials shown in columns 1 and 2 of Table I below, the product shown in column 3 is obtained.

TABLE I

| | Column 1 | | | | | | Column 2 | Column 3 | |
|---|---|---|---|---|---|---|---|---|---|
| | 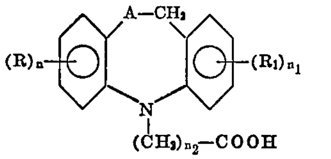 | | | | | | 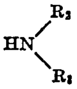 | 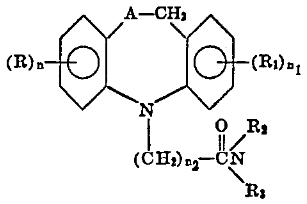 | |
| Ex. No. | R | n | $R_1$ | $n_1$ | A | $n_2$ | | R, n, $R_1$, $n_1$, $n_2$ | 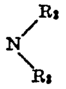 |
| 2 | H | 0 | 3-Cl | 1 | O | 2 | 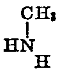 | As in Column 1 | As in Column 2. |
| 3 | 7-Cl | 1 | 3-Cl | 1 | S | 1 | $HN\text{-}[CH(CH_3)_2]_2$ | As in Column 1 | Do. |
| 4 | H | 0 | F | 1 | S | 3 | 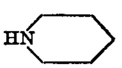 | As in Column 1 | Do. |
| 5 | 7-$CF_3$ | 1 | H | 0 | O | 2 | 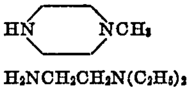 | As in Column 1 | Do. |
| 6 | 6-CN | 1 | 3-$CH_3O$ | 1 | O | 3 | $H_2NCH_2CH_2N(C_2H_5)_2$ | As in Column 1 | Do. |
| 7 | 7-$SO_2N$-$(CH_3)_2$ | 1 | 2-Cl | 1 | S | 4 | 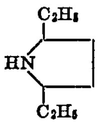 | As in Column 1 | Do. |
| 8 | 7-Cl | 1 | 3-Cl | 1 | O | 2 | 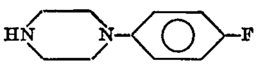 | As in Column 1 | Do. |
| 9 | H | 0 | 2-Cl, 3-Br | 2 | O | 3 | 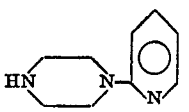 | As in Column 1 | Do. |

EXAMPLE 8

4-[3,[5,11 - dihydro - 7-(trifluoromethyl)dibenz[b,e[1,4] oxazepin-5-yl]propionyl]-1-piperazineethanol maleate A solution of 6.64 g. of 5,11-dihydro - 7 - (trifluoromethyl)dibenz[b,e][1,4]oxazepine-5-propionic acid prepared as described in Example 1, and 2.5 g. of 1-piperazineethanol in 100 ml. of o-xylene is refluxed for 10 hours with azeotropic removal of $H_2O$ using a Dean-Stark water separator. Next, the solvent is removed in vacuo, the residue is triturated with 30 ml. of hexane, the hexane decanted, and the residual semisolid material is dissolved in 30 ml. of acetonitrile and to this is added a solution of 3.2 g. of maleic acid in 15 ml. of acetonitrile. This on standing gives 7.3 g. of white solid, which is recrystallized from 120 ml. of refluxing 2-propanol to give 6.2 g. of the maleate, as a white crystalline solid, M.P. about 158–160° (dec.).

EXAMPLES 9 TO 15

Employing the procedure of Example 8, but substituting the starting materials shown in columns 1 and 2 of Table II, the product shown in column 3 is obtained.

EXAMPLE 16

5,11-dihydro-11-(trifluoromethyl)-5-[3-morpholino-3-oxopropyl]-dibenz[b,e][1,4]oxazepine A blended mixture of 7.0 g. of 5,11-dihydro-11-(trifluoromethyl)dibenz[b,e][1,4]oxazepine-5-propional acid methyl ester, and 2.0 g. of morpholine is heated at 70° for 1 hour, at 100° another hour and then at 125° for 2 hours. Next the reaction mixture is dissolved in 300 ml. of ether, washed, dried, and the solvent distilled out; the residue is heated in vacuo at 70°. The resultant semisolid material is triturated with 30 ml. of cold hexane, when it solidifies to give 5.6 g. of yellowish white compound. This is crystallized twice from 70% ethanol when 4.5 g. of the pure product is obtained as white shining flakes, M.P. about 98–101°.

EXAMPLES 17 TO 23

Employing the procedure of Example 16, but substituting the starting materials shown in columns 1 and 2 of Table III, the product shown in column 3 is obtained.

TABLE II

| Column 1 | | | | | | | Column 2 | Column 3 | |
|---|---|---|---|---|---|---|---|---|---|
| 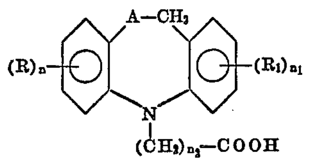 | | | | | | | 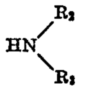 | 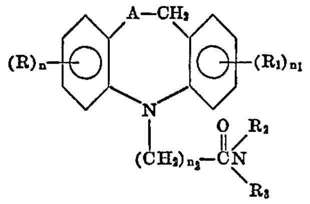 | |
| | | | | | | | | | 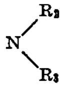 |
| Ex. No. | A | R | n | $R_1$ | $n_1$ | $n_2$ | | A R n $R_1$ $n_1$ $n_2$ | |
| 9 | O | 6-$C_4H_9$ | 1 | 2,3-di-$CH_3$ | 2 | 2 | 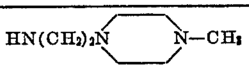 | As in Column 1 | As in Column 2. |
| 10 | S | 7-$SO_2N$-$(CH_3)_2$ | 1 | 3-$C_3H_7$ | 1 | 3 | 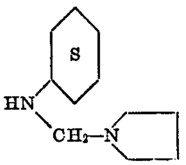 | As in Column 1 | Do. |
| 11 | O | 8-$CH_3O$ | 1 | 1-$CH_3$O3-$CF_3$ | 2 | 2 | 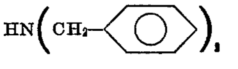 | As in Column 1 | Do. |
| 12 | S | 9-CN | 1 | 2-$CH_3S$ | 1 | 3 | 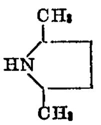 | As in Column 1 | Do. |
| 13 | O | H | 0 | 2,3-di-Cl | 2 | 5 | 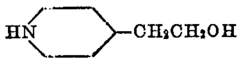 | As in Column 1 | Do. |
| 14 | O | 7-$CF_3$ | 1 | 3-$CF_3$ | 1 | 3 | 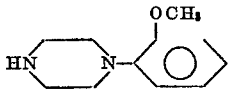 | As in Column 1 | Do. |
| 15 | S | 7-$CF_3$ | 1 | 3-Cl | 1 | 2 | 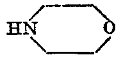 | | |

TABLE III

| Column 1 | | | | | | | | Column 2 | Column 3 | |
|---|---|---|---|---|---|---|---|---|---|---|
| 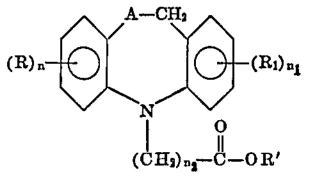 | | | | | | | | 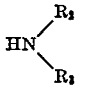 | 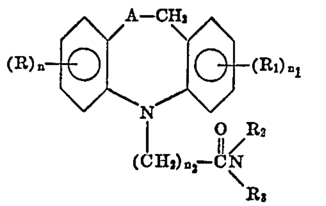 | |
| Ex. No. | A | R | $n$ | $R_1$ | $n_1$ | $n_2$ | R' | | A R $n$ $R_1$ $n_1$ $n_2$ $R^1$ | 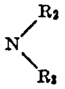 |
| 17 | O | $7\text{-}CF_3$ | 1 | H | 0 | 1 | $CH_3$ | 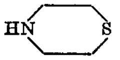 | As in Column 1 | As in Column 2. |
| 18 | S | 6-CN | 1 | 3-I | 1 | 2 | $C_2H_5$ | $HNH(CH_2)_2N(CH_3)_2$ | As in Column 1 | Do. |
| 19 | O | $8\text{-}CH_3O$ | 1 | H | 0 | 3 | $C_3H_7$ | 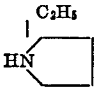 | As in Column 1 | Do. |
| 20 | S | 7,8-di-Cl | 2 | $3\text{-}CF_3$ | 1 | 4 | $C_4H_9$ | 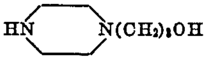 | As in Column 1 | Do. |
| 21 | O | $7\text{-}CF_3$ | 1 | $3\text{-}CF_3$ | 1 | 5 | $C_5H_{11}$ | 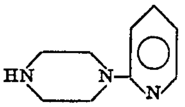 | As in Column 1 | Do. |
| 22 | S | 7-Br | 1 | 3-Cl | 1 | 6 | $C_6H_{13}$ | 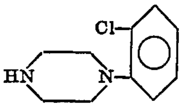 | As in Column 1 | Do. |
| 23 | O | $6\text{-}CF_3$ | 1 | 2-Br | 1 | 3 | $C_4H_9$ | 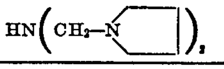 | As in Column 1 | Do. |

EXAMPLE 24

4 - [2-[7-chloro-5,11-dihydrodibenz[b,e][1,4]thiazepin-5-yl]acetyl]α-methyl - 1 - piperazineethanol, 10 - oxide, maleate To a suspension of 36.2 g. of 7-chloro-5,11-dihydrodibenz[b,e][1,4]thiazepine, 250 ml. of ethyl methyl ketone, 0.5 g. of copper-bronze, and 16.0 g. of powdered sodium hydroxide is added dropwise in 0.5 hour 15.1 g. of chloroacetonitrile. The mixture is stirred and refluxed for 10 hours, cooled, and filtered. The filtrate is concentrated in vacuo to remove all volatile material, the residue is crystallized from hexane to give 24.2 g. of 7-chloro-5,11 - dihydrodibenz[b,e][1,4]thiazepine - 5 - acetonitrile, M.P. about 117–120°.

The 7 - chloro-5,11-dihydrodibenz[b,e][1,4]thiazepine-5-acetonitrile, 24.2 g., is dissolved in 1200 ml. of dry dioxane and to this 800 ml. of 20% methanolic hydrogen chloride is added. The solution is stirred for 72 hours; 30 ml. of $H_2O$ is added; the mixture is stirred for 0.5 hour, concentrated in vacuo to 400 ml., filtered, and the filtrate concentrated to dryness in vacuo. The residue solidifies on keeping which is then crystallized from 300 ml. of hexane to yield 20.5 g. 7-chloro-5,11-dihydrodibenz[b,e][1,4]thiazepine-5-acetic acid, methyl ester, M.P. 68–70°, which is dissolved in 2200 ml. of methanol and to this 5.6 g. of potassium hydroxide dissolved in 300 ml. of $H_2O$ is added. The solution is refluxed for 4 hours, and then is concentrated in vacuo. The residue is taken up in 600 ml. of $H_2O$; the solution is cooled, and then acidified with 2% aqueous hydrogen chloride. The solid is filtered and dissolved in 600 ml. of benzene. This solution is treated with Darco and then extracted with 600 ml. of 2% aqueous sodium hydroxide solution. The extracts are treated with Darco and Hyflo, filtered and the filtrate is acidified with 2% aqueous hydrogen chloride. The solid is filtered and recrystallized from benzene to yield 15.1 g. of 7-chloro-5,11-dihydrodibenz[b,e][1,4]thiazepine-5-acetic acid.

To a solution of 9.1 g. of 7-chloro-5,11-dihydrodibenz[b,e][1,4]thiazepine-5-acetic acid in 500 ml. of 95% ethanol, is added 3.0 g. of 31.9% hydrogen peroxide and the solution is heated under reflux for 10 hours. Concentration in vacuo gives 14.2 g. of the semisolid residue which is crystallized from 40 ml. of hot hexane to give 12.4 g. of 7 - chloro - 5,11 - dihydrodibenz[b,e[1,4]-thiazepine-5-acetic acid 10-oxide, M.P. 123–125°. This is dissolved in 150 ml. of o-xylene and to this is added 6.4 g. of α-methyl-1-piperazine ethanol in 50 ml. of o-xylene. The reaction mixture is refluxed for 10 hours with azeotropic removal of water. The solvent is removed in vacuo; the residue is triturated with 50 ml. of hexane, the hexane decanted, and the residual liquid is dissolved in 30 ml. of 2-propanol and to this is added a solution of 6.3 g. of maleic acid in 20 ml. of 2-propanol. This on standing gives 12.1 g. of white crystalline solid which is recrystallized from 350 ml. of acetonitrile to give 10.1 g. of the maleate, M.P. about 149–151°.

EXAMPLES 25 TO 30

Employing the procedure of Example 24, but substituting the acid starting material shown in column 1 of Table IV in forming the oxide which oxide is converted to oxide-acid chloride and then reacting the oxide acid chloride with the starting material shown in column 2, the product shown in column 3 is obtained.

TABLE IV

| Ex. No. | Column 1: R | n | R₁ | n₁ | n₂ | Column 2 | Column 3: R, n, R₁, n₁, n₂ | Column 3: $N(R_2)(R_3)$ |
|---|---|---|---|---|---|---|---|---|
| Structure | 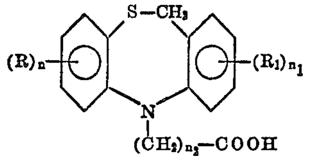 | | | | | 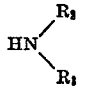 | 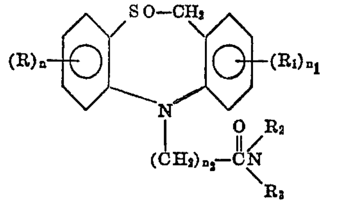 | |
| 25 | 7-Br | 1 | H | 0 | 1 | $HN(C_3H_7)_2$ | As in Column 1 | As in Column 2. |
| 26 | 7-Cl | 1 | 3-Cl | 1 | 2 | 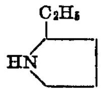 | As in Column 1 | Do. |
| 27 | 7-$CF_3$ | 1 | 3-$CF_3$ | 1 | 3 | 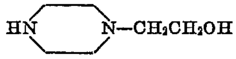 | As in Column 1 | Do. |
| 28 | 6-$CH_3O$ | 1 | 2-CN | 1 | 4 | 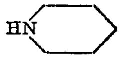 | As in Column 1 | Do. |
| 29 | H | 0 | 3-$SO_2N$-$(CH_3)_2$ | 1 | 5 | 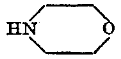 | As in Column 1 | Do. |
| 30 | 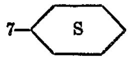 | 1 | 3-$CH_3S$ | 1 | 3 | 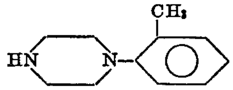 | As in Column 1 | Do. |

EXAMPLE 31

N-[2-(diethylamino)ethyl]-5,11 - dihydro - 7 - (trifluoromethyl)dibenz[b,e][1,4]thiazepine - 5 - butyramide, 10, 10-dioxide, maleate A suspension of 2.0 g. of sodium cyanide in 10 ml. of dimethyl sulfoxide is heated to 90°. To this while stirring, is added within 10 minutes, a solution of 10.3 g. of 5-(3-chloropropyl)-5,11-dihydro - 7-(trifluoromethyl) dibenz[b,e][1,4]thiazepine in 20 ml. of dimethyl sulfoxide. The reaction mixture is heated to 160–165° For 45 minutes, allowed to come to 30° and poured into 400 ml. of water. The mixture is saturated with sodium chloride and extracted with 500 ml. of ether. The ether solution is separated and the aqueous layer is again extracted with 2–200 ml. portions of ether. The combined ether extracts are washed, dried, treated with Darco and filtered. The filtrate is concentrated to dryness in vacuo. The semisolid residue is crystallized from 350 ml. of boiling hexane to give about 8.9 g. of white solid, M.P. about 56–64°. This is recrystallized from 400 ml. of hexane to give about 7.9 g. of 5,11-dihydro-11-(trifluoromethyl)dibenz[b,e][1,4]thiazepine - 5 - butyronitrile, M.P. about 68–70°.

The 5,11-dihydro-7-(trifluoromethyl)dibenz]b,e][1,4] thiazepine-5-butyronitrile 80.5 g. is dissolved in 1200 ml. of dry dioxane and to this 800 ml. of 30% methanolic hydrogen chloride is added. The solution is stirred for 72 hours, 30 ml. of $H_2O$ is added, the mixture is stirred for 0.5 hour, concentrated in vacuo to 400 ml. filtered, and the filtrate concentrated to dryness in vacuo. The residue solidifies on keeping, which is then crystallized from hexane to yield 5,11-dihydro-7-(trifluoromethyl)dibenz[b,e][1,4]thiazepine-5-butyric acid, methyl ester, M.P. about 97–98°.

The 5,11-dihydro-7-(trifluoromethyl)dibenz[b,e][1,4] thiazepine-5-butyric acid, methyl ester, M.P. 97–98°. 27.3 g. is dissolved in 2200 ml. of methanol and to this 5.6 g. of potassium hydroxide dissolved in 300 ml. of $H_2O$ is added. The solution is refluxed for 4 hours, and then is concentrated in vacuo. The residue is taken up in 600 ml. of $H_2O$, the solution is cooled, and then acidified with 2% aqueous hydrogen chloride. The solid is filtered and dissolved in 600 ml. of benzene. This solution is treated with Darco and then extracted with 600 ml. of 2% aqueous sodium hydroxide solution. The extracts are treated with Darco and Hyflo, filtered and the filtrate is acidified with 2% aqueous hydrogen chloride. The solid is filtered and recrystallized from benzene to yield 5,11-dihydro-7 - (trifluoromethyl)dibenz[b,e] [1,4]thiazepine-5-butyric acid, M.P. about 131–133°.

To a solution of 8.1 g. of 5,11-dihydro-7-(trifluoromethyl)dibenz[b.e][1,4]thiazepine-5-butyric acid in 40 ml. of 98–100% formic acid, is added dropwise, 14 ml. of 30% hydrogen peroxide; this results in an exothermic reaction. The reaction mixture is heated at 70° for 3 hours, and concentrated in vacuo at 45°. The residue is dissolved in 300 ml. of ether and the ether solution is extracted in 250 ml. of 2% aqueous sodium hydroxide. The alkaline solution is cooled to 5° and made acidic with 10% aqueous hydrochloric acid, the white precipitate filtered and dried. This on crystallization from 350 ml. in hot hexane gives 6.3 g. of 5,11-dihydro-7-(trifluoromethyl)dibenz[b,e][1,4]thiazepine-5-butyric acid, 10,10-dioxide; M.P. 115–117°. This is dissolved in 200 ml. of anhydrous o-xylene and to this 5.0 g. of 2-(diethylamino) ethyl amine is added and refluxed for 10 hours with azeotropic removal of water. Next, the reaction mixture is concentrated to dryness in vacuo at 60° to give 9.2 g. of semisolid residue, which is triturated with 30 ml. of petroleum ether (30–60°) when it solidifies to give 8.0 g. of white solid, M.P. about 98–99°. This is converted to maleate salt which melts at about 138–140°.

EXAMPLES 32 TO 37

Employing the procedure of Example 31 but substituting the acid starting material shown in column 1 of Table V in forming the dioxide and then reacting the dioxide with the starting material shown in column 2, the product shown in column 3 is obtained.

TABLE V

| Column 1 | Column 2 | Column 3 |
|---|---|---|
| 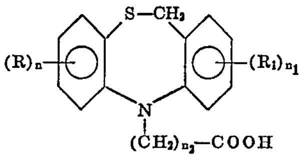 | 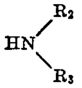 | 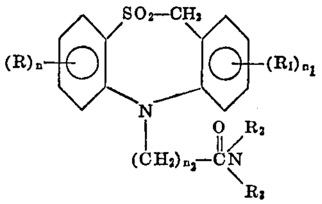 |

| Ex. No. | R | n | R1 | n1 | n2 | Column 2 | R n R1 n1 n2 | 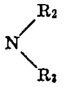 |
|---|---|---|---|---|---|---|---|---|
| 32 | 7-CF3 | 1 | H | 0 | 1 | 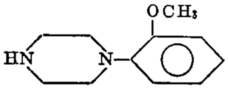 | As in Column 1 | As in Column 2. |
| 33 | 6-CF3 | 1 | 3-CF3 | 1 | 2 | 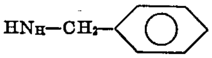 | As in Column 1 | Do. |
| 34 | 7,8-di-Cl | 2 | 3-Cl | 1 | 3 | 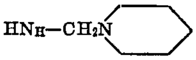 | As in Column 1 | Do. |
| 35 | H | 0 | 3-CN | 1 | 4 | 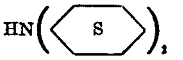 | As in Column 1 | Do. |
| 36 | 8-CN | 1 | 3-SO2N—(CH3)2 | 1 | 5 | HN(CH2)3N(CH3)2 | As in Column 1 | Do. |
| 37 | 7-C2H5S— | 1 | 3-CH3S— | 1 | 6 | 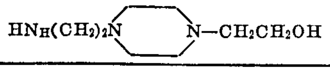 | As in Column 1 | Do. |

What is claimed is:

1. A compound of the structure

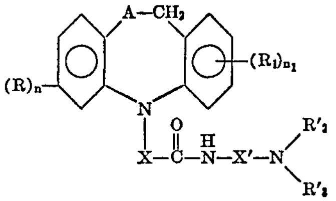

wherein A is O or S, R is trifluoromethyl or chloro, $R_1$ is chloro or bromo, $R'_2$ and $R'_3$ are the same or different and are hydrogen or lower alkyl of up to eight carbon atoms, X and X' are the same or different and are alkylene groups of from one to six carbon atoms, $n$ is 0 or 1, $n_1$ is 0, 1, or 2, and a physiologically acceptable acid-addition salt thereof.

2. A compound in accordance with claim 1 wherein A is O.

3. A compound in accordance with claim 1 wherein A is S.

4. The compound having the structure

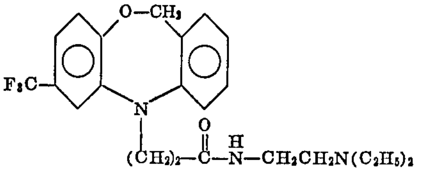

5. The compound having the structure

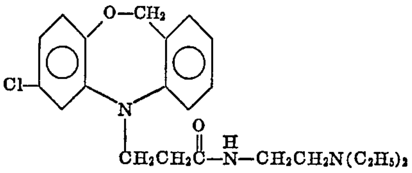

References Cited

UNITED STATES PATENTS

| | | | |
|---|---|---|---|
| 3,071,596 | 1/1963 | Yale et al. | 260—268 TR |
| 3,188,321 | 6/1965 | Yale et al. | 260—268 TR |
| 3,387,002 | 6/1968 | Yale et al. | 260—268 TR |
| 3,452,046 | 6/1969 | Yale et al. | 260—268 TR |

DONALD G. DAUS, Primary Examiner

U.S. Cl. X.R.

260—239 BC, 243 B, 247.1, 247.5, 268 TR, 293.57, 293.58, 326.81, 327 B, 999

PO-1050
(5/69)

UNITED STATES PATENT OFFICE
CERTIFICATE OF CORRECTION

Patent No. 3,766,210 Dated October 16, 1973

Inventor(s) Harry Louis Yale and Ramesh B. Petigara

It is certified that error appears in the above-identified patent and that said Letters Patent are hereby corrected as shown below:

Column 1, lines 65 to 70, delete the parenthesis shown in the formula.

Column 5, formula number 9, that portion of the formula reading:

" 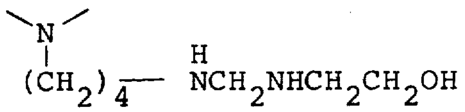 "

should be: -- 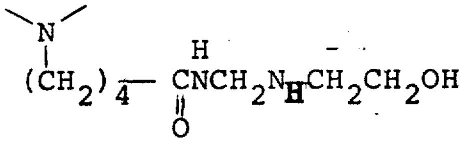 --.

Column 6, formula number 17, that portion of the formula reading:

" 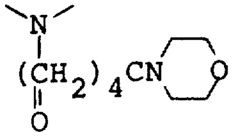 " should be: -- 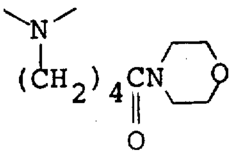 --.

Column 9, line 13, "wherin" should be: -- wherein --.

Column 11, structure "(VX)" should be: -- (XV) --.

Column 13, formula number 17, that portion of the formula reading:

" 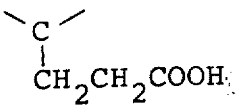 should be: -- 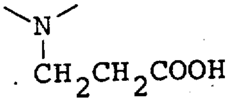 --.

PO-1050
(5/69)

UNITED STATES PATENT OFFICE
CERTIFICATE OF CORRECTION

Patent No. 3,766,210 Dated October 16, 1973

Inventor(s) Harry Louis Yale and Ramesh B. Petigara

It is certified that error appears in the above-identified patent and that said Letters Patent are hereby corrected as shown below:

Column 13, formula 18, that portion of the formula reading:

" 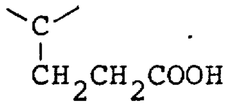

" should be: -- 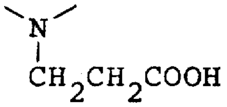

--.

Column 16, line 2, after "refluxed for" insert the following: -- 2.5 hours and then concentrated in vacuo. The residue is --.

Column 18, Table II, Example 14, Column 2, that portion of the formula reading:

" 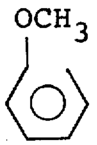

" should be: -- 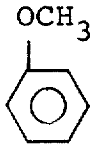

--.

Column 20, line 54, "40 ml." should be: -- 400 ml. --.

Column 20, line 55, "dihydrodibenz[b,e[1,4]-" should be: -- dihydrodibenz[b,e][1,4] --.

Column 21, line 61, "dibenz]b,e][1,4]" should be: -- dibenz[b,e][1,4] --.

Column 22, line 48, "dibenz[b.e]" should be: -- dibenz[b,e] --.

Signed and sealed this 21st day of May 1974.

(SEAL)
Attest:

EDWARD M.FLETCHER,JR.
Attesting Officer

C. MARSHALL DANN
Commissioner of Patents